(12) United States Patent
Chedgey et al.

(10) Patent No.: US 7,409,679 B2
(45) Date of Patent: Aug. 5, 2008

(54) SYSTEM AND METHOD FOR COMPUTER-AIDED GRAPH-BASED DEPENDENCY ANALYSIS

(75) Inventors: Christopher Chedgey, Coxtown (IE); Brendan O'Reilly, Greystones (IE)

(73) Assignee: Headway Research Limited, Greystones (IE)

( * ) Notice: Subject to any disclaimer, the term of this patent is extended or adjusted under 35 U.S.C. 154(b) by 186 days.

(21) Appl. No.: 09/742,255

(22) Filed: Dec. 20, 2000

(65) Prior Publication Data
US 2004/0205726 A1 Oct. 14, 2004

(30) Foreign Application Priority Data
Dec. 20, 1999 (IE) .................................. 991070

(51) Int. Cl.
*G06F 9/45* (2006.01)
(52) U.S. Cl. ........................ 717/144; 717/127; 717/131; 717/144; 717/143; 717/155; 717/156
(58) Field of Classification Search ......... 717/110–113, 717/124–160; 345/763, 441–738; 707/101–105
See application file for complete search history.

(56) References Cited
U.S. PATENT DOCUMENTS

| | | | | |
|---|---|---|---|---|
| 5,490,246 A | * | 2/1996 | Brotsky et al. | 345/763 |
| 5,692,184 A | * | 11/1997 | Ardoin et al. | 707/103 R |
| 5,940,083 A | * | 8/1999 | Broekhuijsen | 345/442 |
| 6,108,006 A | * | 8/2000 | Hoppe | 345/423 |
| 6,300,957 B1 | * | 10/2001 | Rao et al. | 345/441 |
| 6,339,776 B2 | * | 1/2002 | Dayani-Fard et al. | 707/102 |
| 6,343,376 B1 | * | 1/2002 | Saxe et al. | 717/154 |
| 6,359,635 B1 | * | 3/2002 | Perttunen | 345/834 |

OTHER PUBLICATIONS

Guy E. Blelloch Provably Efficient Scheduling For Language With Fine Grained Parallelism, Published 1999, pp. 282-320.*

* cited by examiner

*Primary Examiner*—Chuck O Kendall
(74) *Attorney, Agent, or Firm*—Morgan, Lewis & Bockius LLP

(57) ABSTRACT

The present invention is directed to a system and methods for analyzing dependencies. The dependencies that may be analyzed include, for example, dependencies among methods or procedures in software source code, or in system configuration or deployment. A layered system is provided, comprising a back-end layer, abstraction layer and user interface layer are used to derive dependency information from third-party tools, and present the information through uniform interfaces to a user-interface layer. The system maintains a dependency model as a hierarchical graph structure in computer memory, and provides a plurality of user views which may be manipulated actively or passively by the user. Active manipulations are propogated through the back-end layer to modify the system analyzed, and passive manipulations affect the user views without changing the analyzed system. The system provides advantages to users seeking to understand complex systems with many dependencies.

8 Claims, 14 Drawing Sheets

– The Higraph Structure

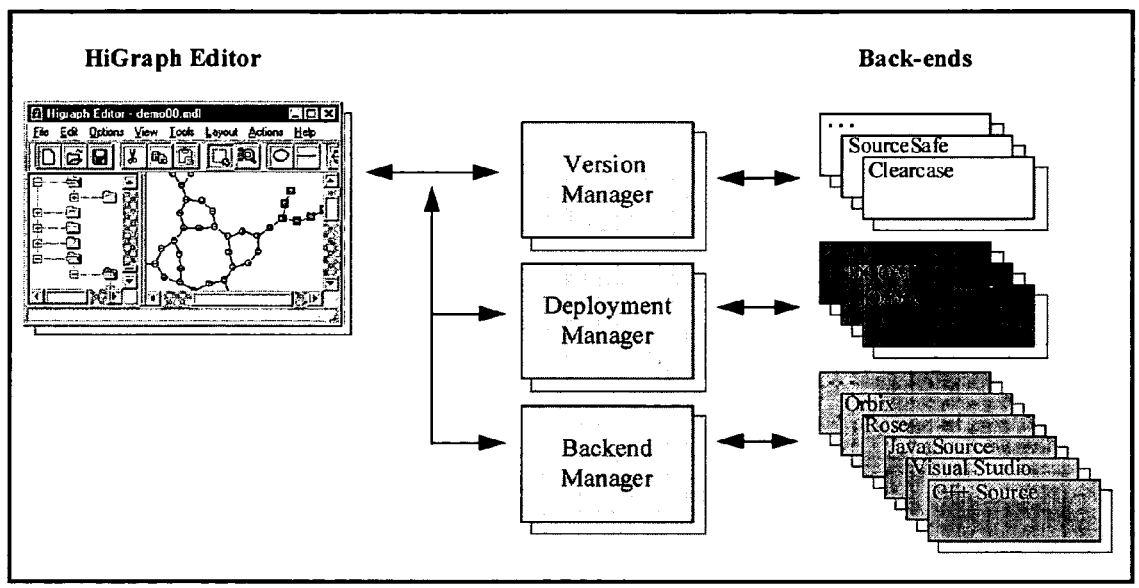
Fig. 1 – Technology Overview
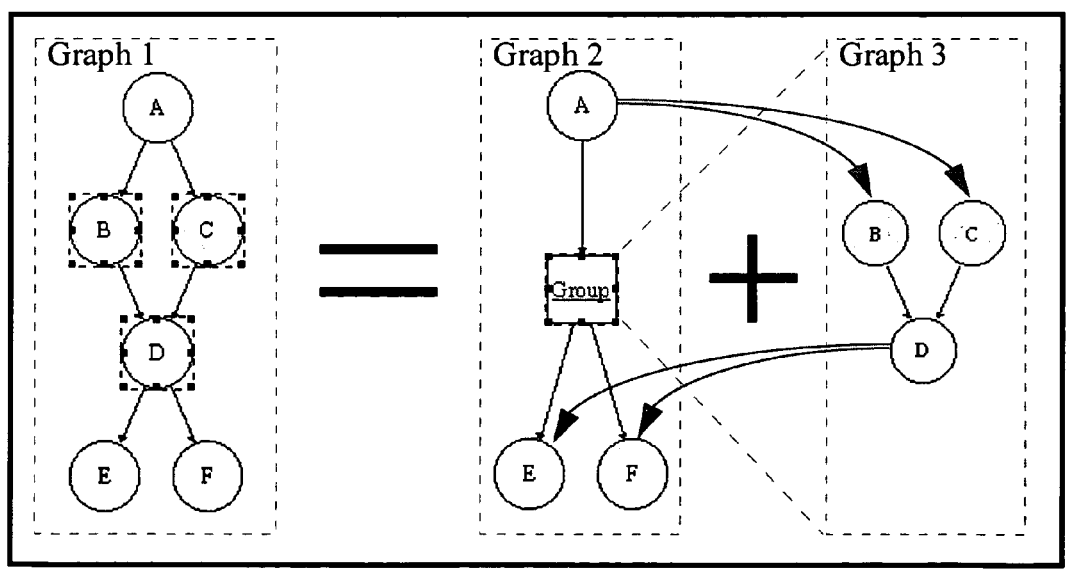
Fig. 2 – The Higraph Structure

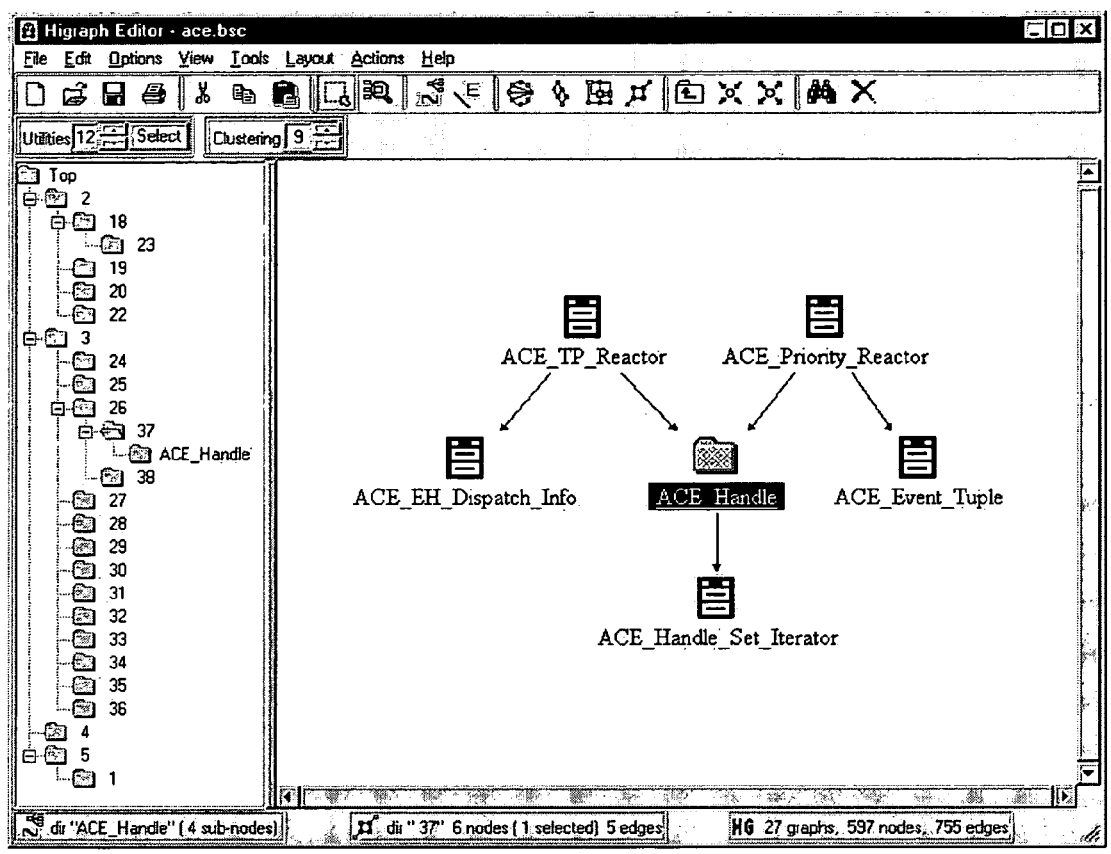
Fig. 3 – The Higraph Editor

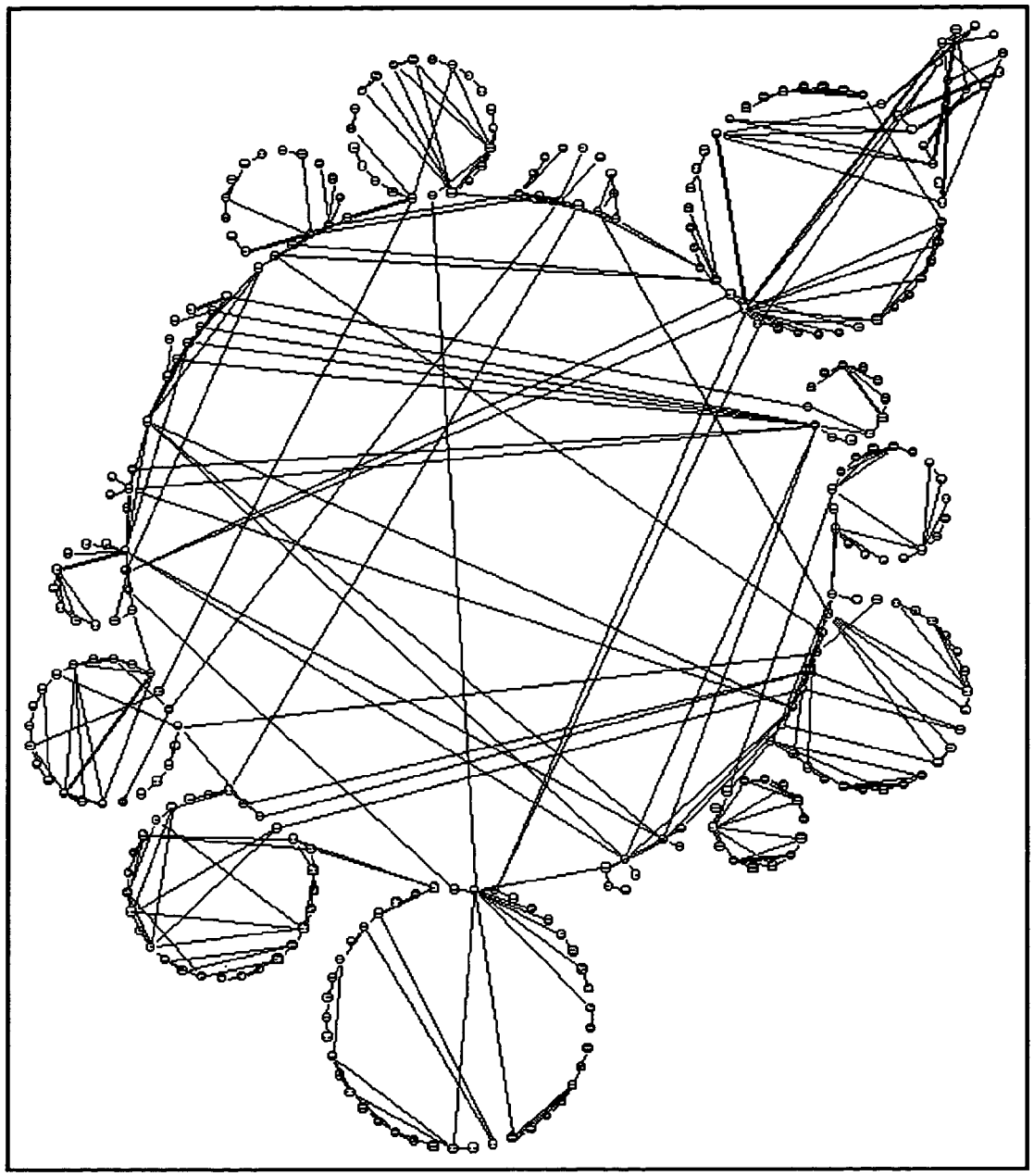
Fig. 4 – Automatic layout reveals inherent structures

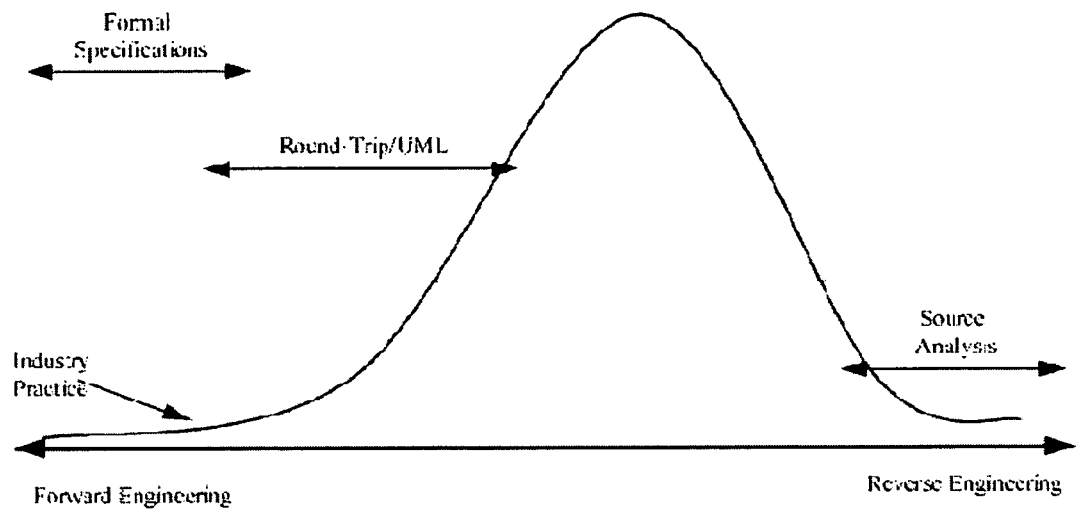
*Fig. 5 – State of The Art*
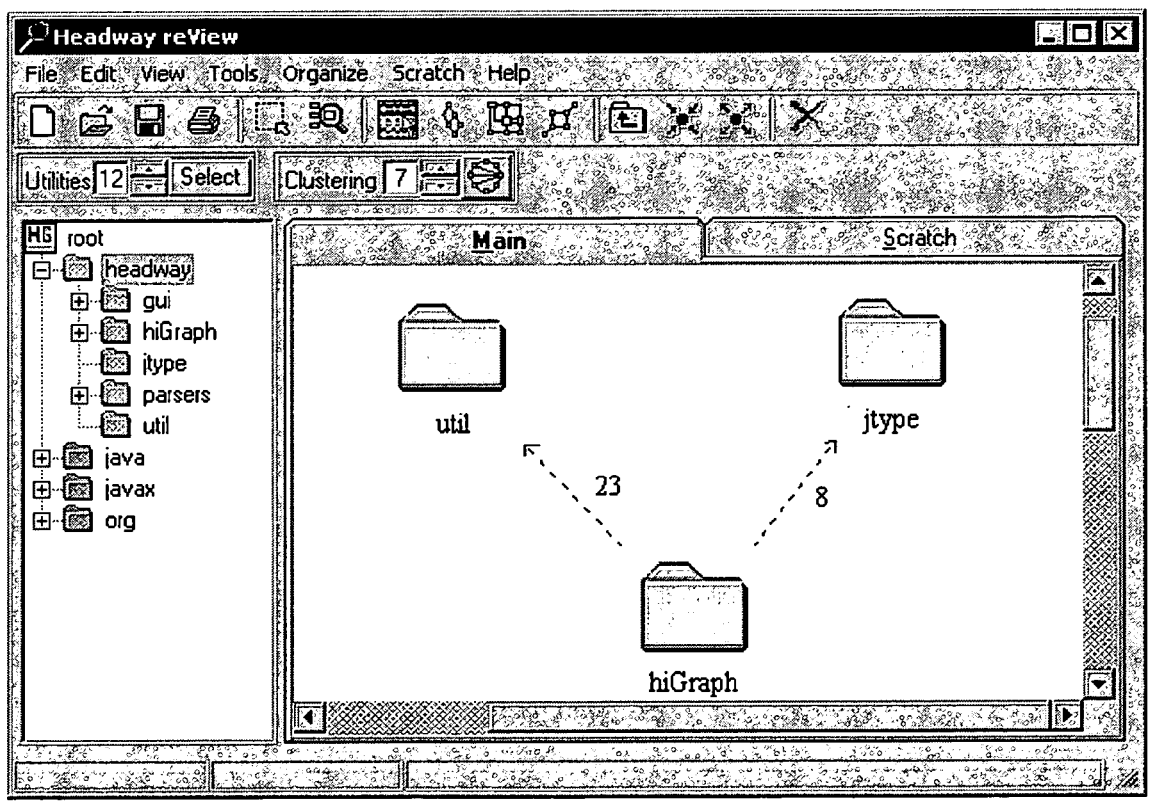
*Fig. 6 - "Depth" of Hiedges displayed numerically*

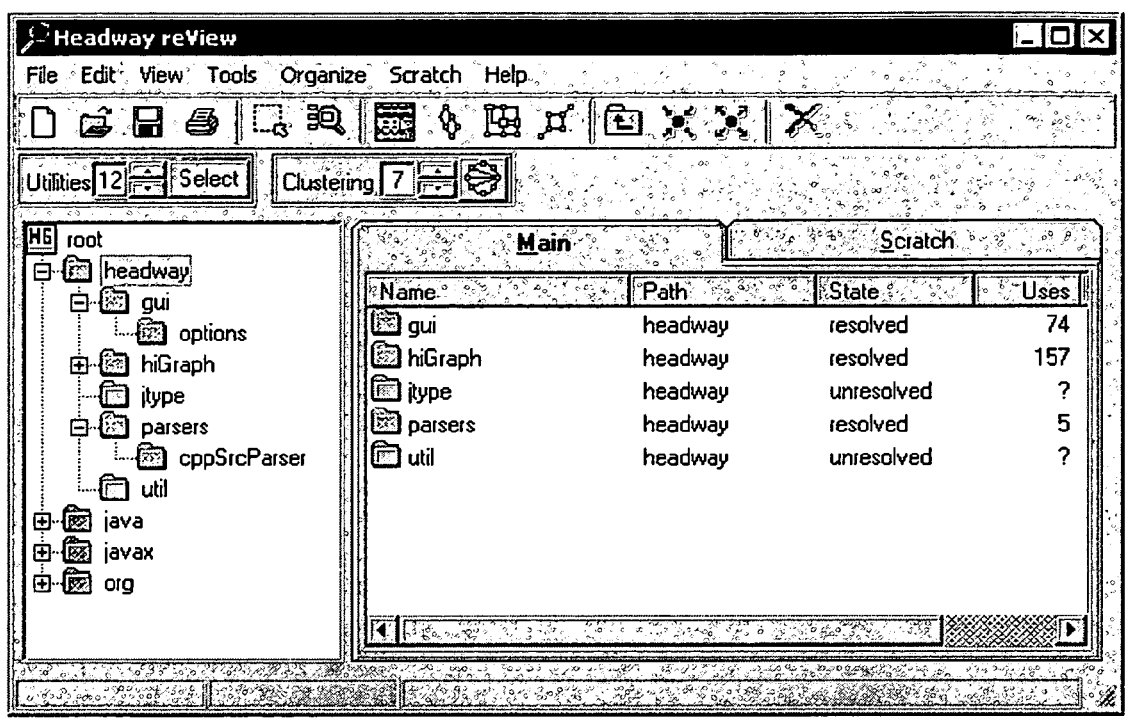
Fig. 7 – Treeview with Listview

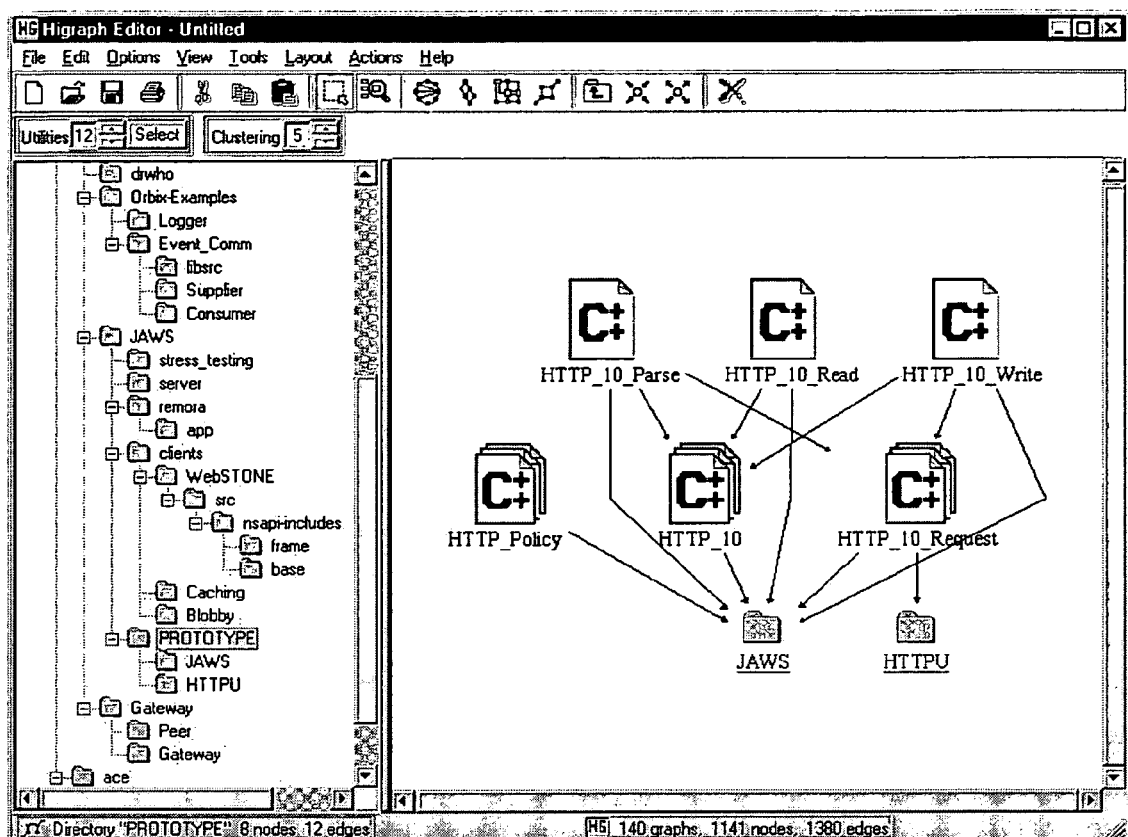
Fig. 8 – Treeview with Directed Graph

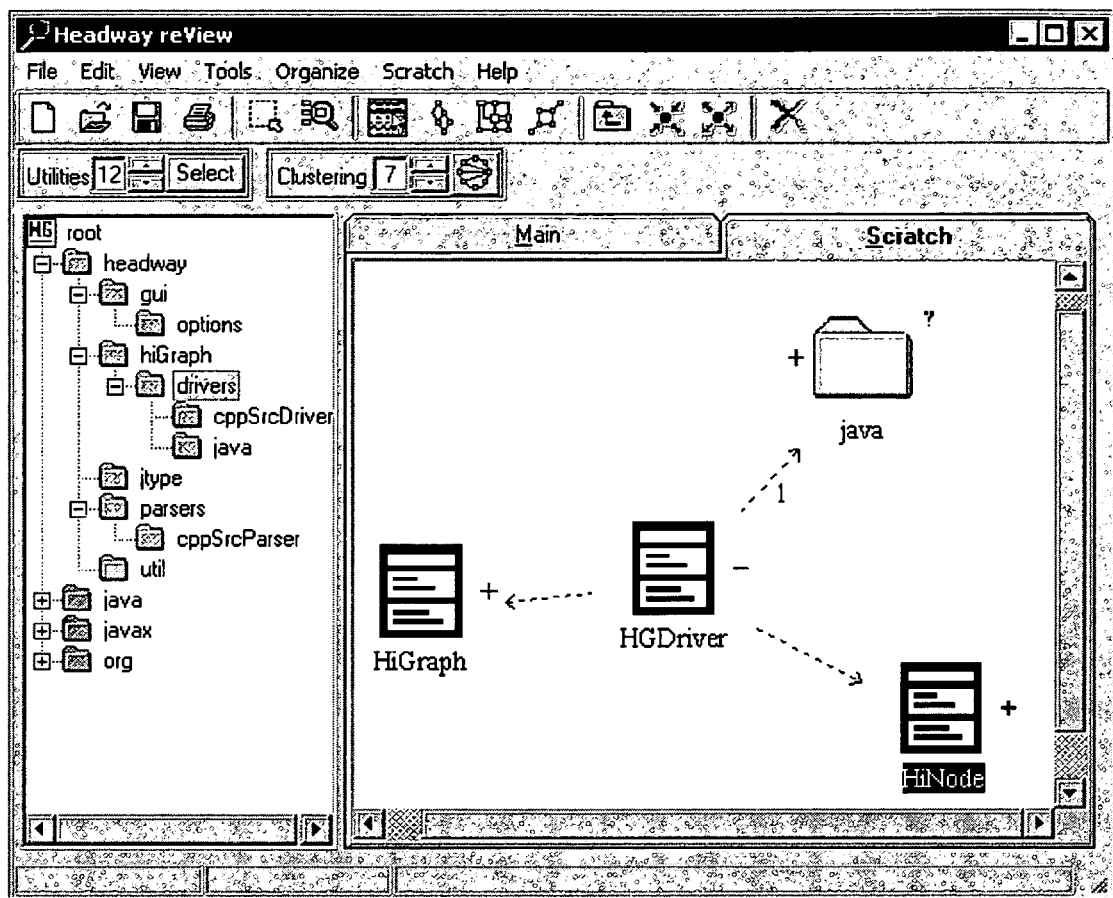
Fig. 9 – Scratch Graph View

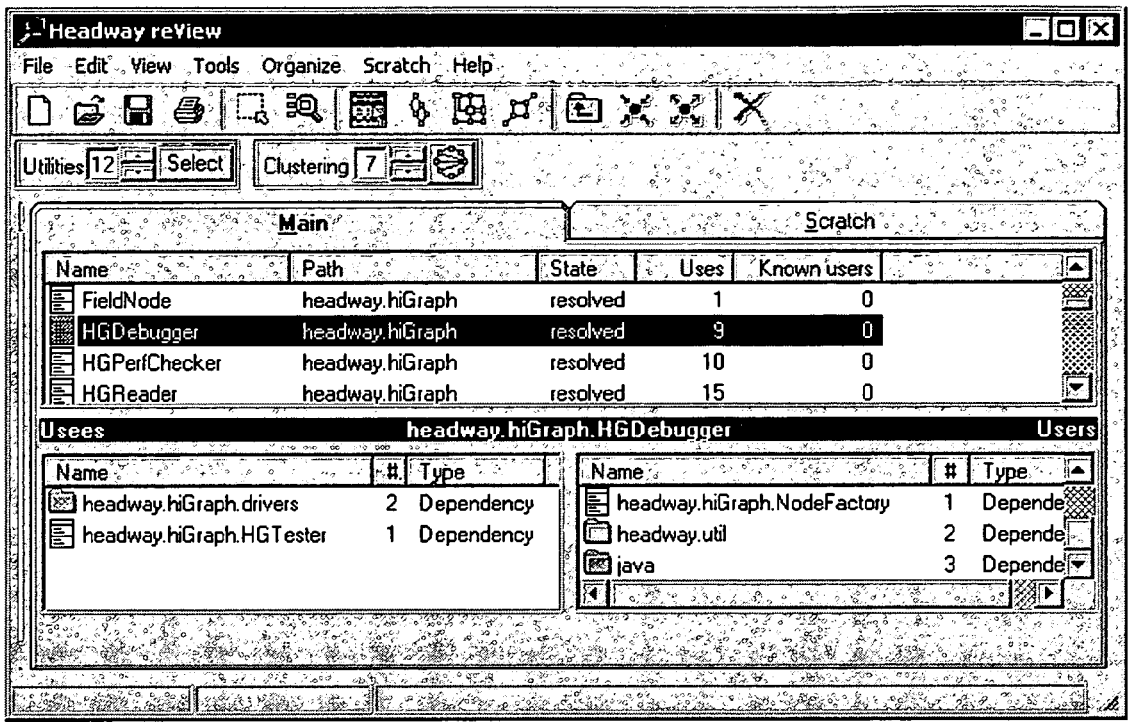
Fig. 10 – Dependency Viewer
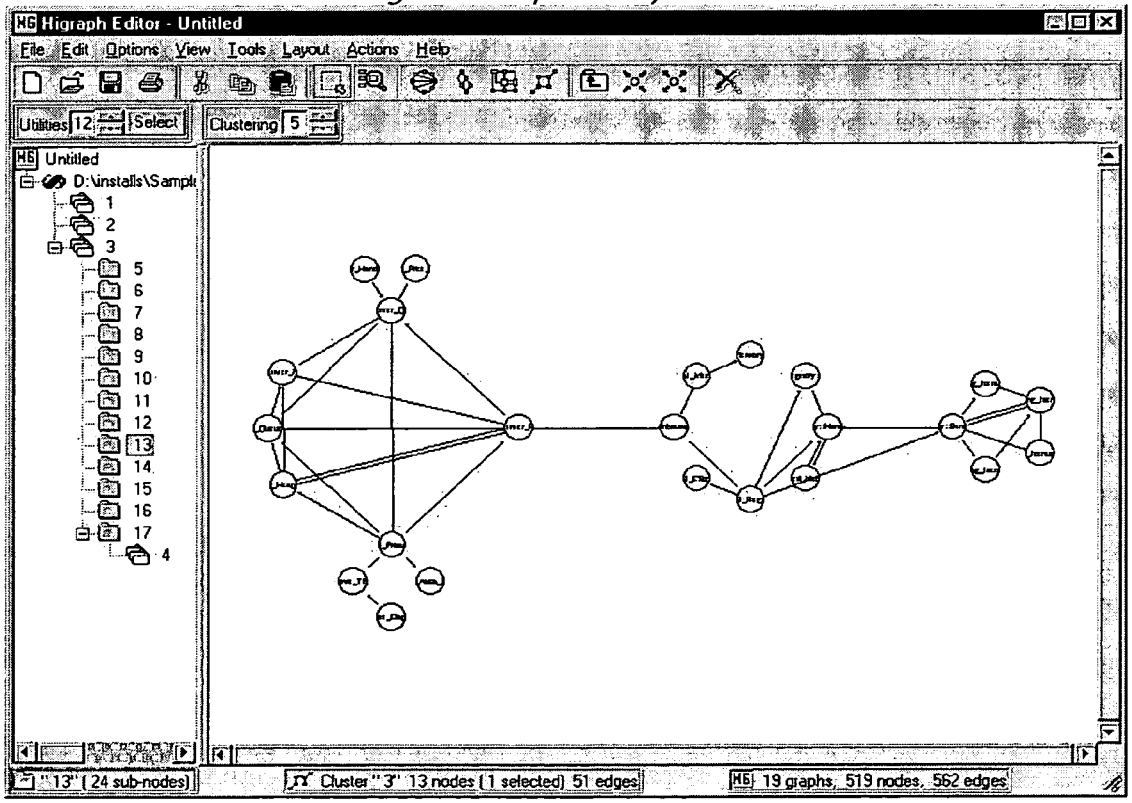
Fig. 11 - Clustering in a Circular Layout

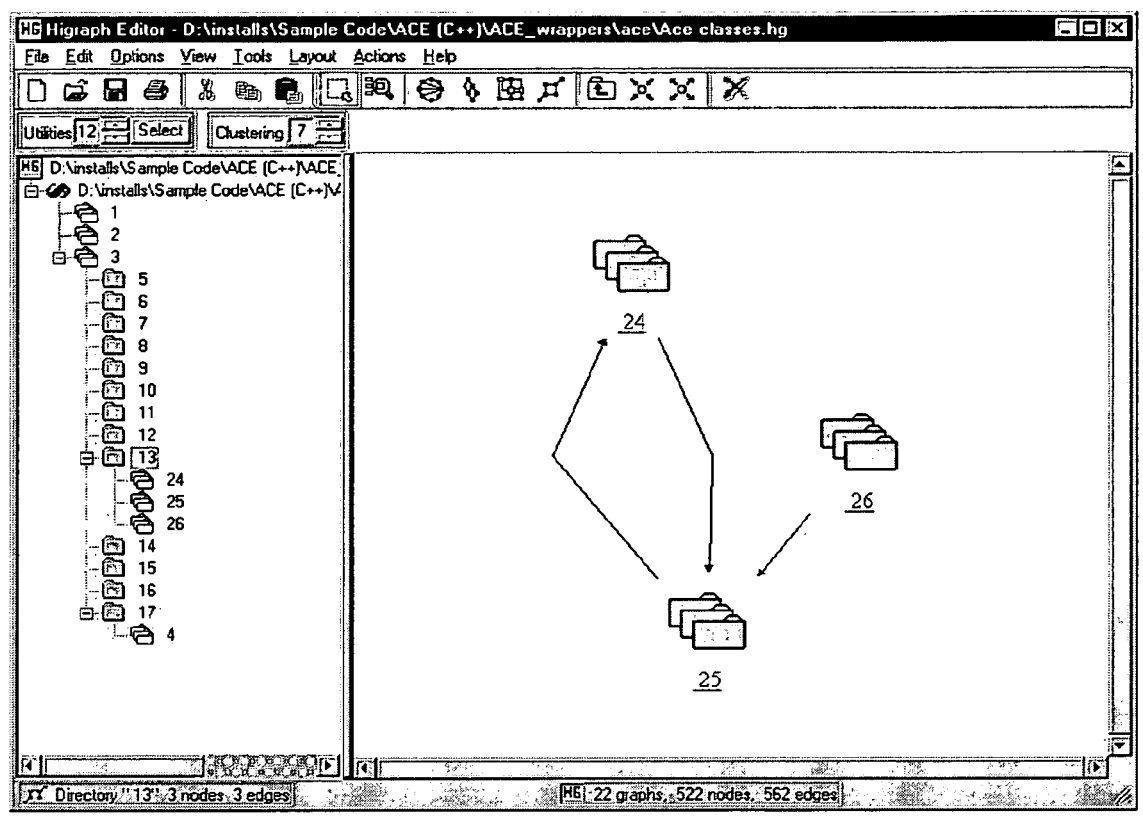
Fig. 12 - Automatic Folding of Clusters

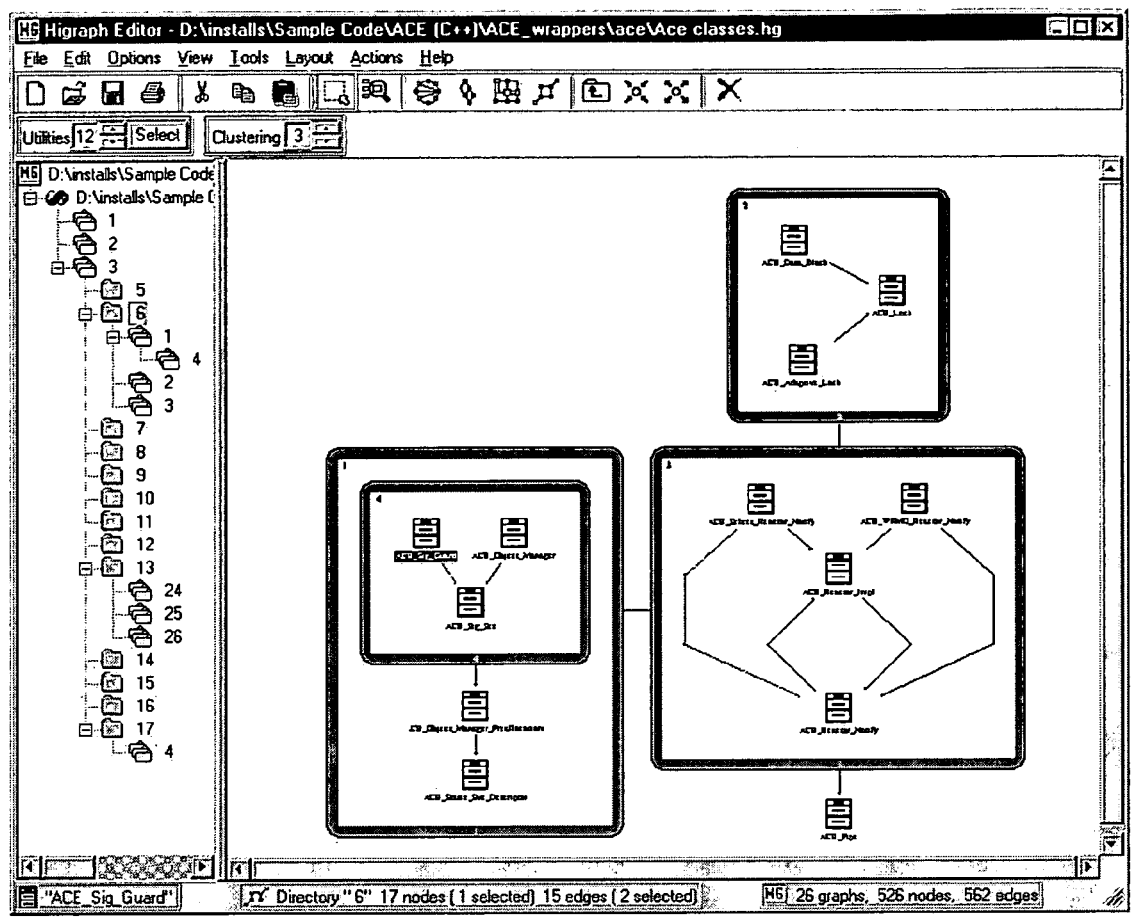
Fig. 13 – Node Expansion

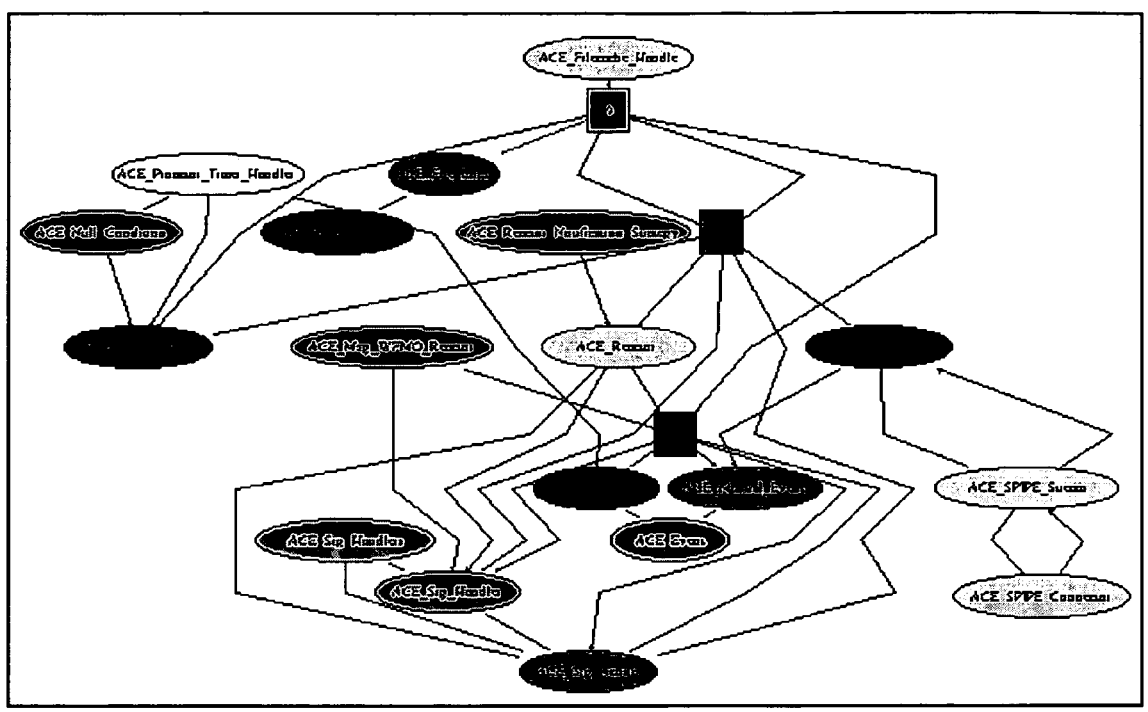
Fig. 17 – Continuous Value Display on a Higraph

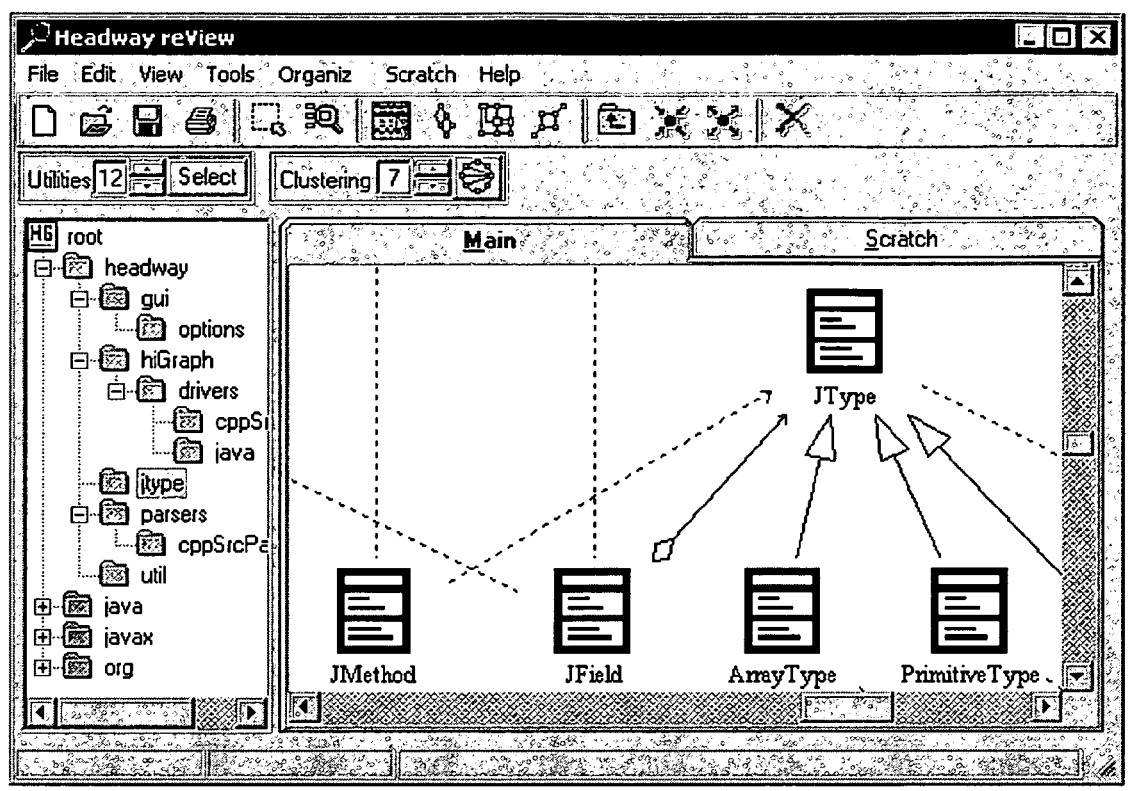
Fig. 18 - UML Relationship Notation within the Higraph

SYSTEM AND METHOD FOR COMPUTER-AIDED GRAPH-BASED DEPENDENCY ANALYSIS

FIELD OF THE INVENTION

The present invention is directed to methods and systems for computer-aided dependency analysis and design. In one aspect, the invention relates to analysis of software such as C++ code.

BACKGROUND OF THE INVENTION

One of the major problems in software development and maintenance is that of keeping track of the structure of the code so that changes may be made and, more generally, that the operation of the software may be understood.

Very often, too few developers know a particular application's source code and it's vagaries sufficiently well to be able to make changes quickly. The code itself is either poorly structured and/or documented, usually as a result of being rushed into production, or because the code has been patched or layered too often without sufficient consideration. Even when code is properly structured and documented it can be equally difficult for someone to appreciate this fact without weeks of research. Before ever a line of code is touched, man weeks and months of effort go into understanding the application's innards. Difficult questions about which classes are grouped together as a component, which classes inherit from one another, which pieces of code pass parameters to one another, etc., all need to be answered before code is altered. The reason for this is that making a change in one part of the application can bring on changes in multiple other locations, and quite frequently unit testing of the code that has been changed may be insufficient, and more extensive regression or even system testing may be needed. This costs a lot of money, assuming that resources are available in the first instance. It also assumes that the human resources will continue in position for a sufficient period of time to understand the application so as to be able to make changes quickly. Programmers usually use text based editors to view code and make changes. Their managers normally understand the scope of developer's tasks by asking for diagrams, and discussing program source code attributes such as the number of lines of code, function points, number of classes etc. This normally takes place in meeting rooms using flip-charts which are pinned on the wall and used as references which of course change as time progresses. This is a time-consuming and inaccurate method for communication common and sharable information.

Traditional engineering practices that work well for hardware engineering have difficulty in dealing with software. Such practices involve a "top-down" (or more generally, spiral) process that produces design artifacts before manufacturing starts.

The closest analogy to "instructions for manufacturing" that applies to software are formal specifications. Formal specifications precisely define what software components should do without specifying how they are implemented. In principle this gives both programmers and testers descriptions from which to work independently.

Specification-driven development and testing is useful for applications in aerospace or the military with stable requirements, high reliability demands and few budget restrictions. This approach is not cost-effective for the majority of software projects.

The generally accepted "best practice" for mainstream software development is the spiral or iterative model used with the Unified Modelling Language (UML). This approach builds the product by incrementally analysing, designing, implementing and testing a set of use-cases. Each iteration results in an updated UML model and the corresponding executable software and test cases.

Many developers that have used the iterative/UML approach would agree that it adds a degree of rigour to the process, and that the UML diagrams serve as a useful roadmap and concise shorthand for the underlying source code.

However, the cost and effort required to introduce UML may not always be justified by the benefit. It is an invasive method that requires a lot of training and change of work practices, which are not easily accomodated in gradual fashion. Models must be generated for all work in progress. The software industry is very time-sensitive, and schedule pressures mean that the delay today for a potential future gain cannot be tolerated.

The usefulness of UML models is also limited because the notion that there is a single design (albeit one that evolves) that serves all purposes throughout the life of the development is flawed. In reality each member of the development team, be they architect, designer, implementer, integrator, manager, teamleader, tester, configuration manager, project manager, product manager, etc., each require their own view of the software "design". The required view continually changes as the individual's activity changes. All these views must be accurate and consistent with some common underlying reality. Current UML tool offerings do not support such a dynamic, interactive, multi-view based usage, and this partly explains why there is not universal enthusiasm for UML modelling.

In an attempt to reduce the risks and costs while keeping the benefits, many organizations use UML as a reverse-engineering technology. This way, fewer staff need to be trained in the use of the method and tools. The diagrams are reverse engineered from the source code, and design documentation is produced after the product is implemented.

In principle this is a reasonable approach. In practice, most UML tools are really designed for forward engineering. While they do provide reverse (or "round-trip") engineering functionality, it is assumed that any changes from the model are relatively few and that the user can reasonably update the model organisation and layout manually.

This is certainly not the case for a large pre-existing or in-progress software project for which no model has ever been generated. Organising a reverse-engineered model using a forward-engineering tool is extremely laborious and is unlikely to either reflect the design intended by the developers, nor to expose an optimal inferred design.

Specialized reverse engineering tools offer the ability to parse existing source code and to provide the programmer with detailed information not readily available from the the source code. This is typically cross-reference or similar information. Although such tools sometimes claim to aid software comprehension, the information they provide is too detailed to help with "design-level" comprehension and is more suited to programming, debugging and maintenance activities.

There is clearly a rift between the available design technology and the needs of the development community. On offer is a choice between expensive, invasive, relatively static, forward-biased design tools and low-level, implementation-biased reverse-engineering tools. There is little or no tool support that addresses the status quo of mainstream software development.

The state of the art is schematically illustrated in FIG. 5, which represents a histogram of the proportion of software developers versus the relative degree of forward- or reverse-engineering used to develop software. As described above, formal specification is a rigorous forward-engineering practice used by relatively few developers. Round-trip UML design is a somewhat less rigorous forward-engineering practice used by a substantial population of programmers, but not by the majority. Source analysis 103 is a reverse-engineering practice only sometimes used in software development. The majority of developers representing most of the area under the histogram are under-served by existing technologies.

There is thus a need for a technology and notation that can be applied to existing or in-progress software development projects without the need for extensive training or change of work practices and minimal negative impact on on-going work. There is also a need for such a technology to support both large-scale reverse-engineering as well as efficient inference of relevant essential design information. A system that can provide highly interactive and dynamic views is needed, to enable individuals to expose and focus on information that pertains to the task in which they are engaged. Such a system should not simply construct static designs, but rather allow users to actively engage with the software, simultaneously exposing specific information and increasing overall comprehension.

FIGURES

FIG. 1 is a schematic diagram illustrating a software analysis tool of the invention;

FIG. 2 is a diagram showing a multi-dimensional structure of a higraph;

FIG. 3 is a sample display of an editor;

FIG. 4 is a sample display after editor automatic layout;

FIG. 5 is a histogram illustrating the state of the art;

FIG. 6 is a sample higraph view of hiedges showing "depth";

FIG. 7 is a sample higraph view using a tree view and listview;

FIG. 8 is a sample higraph view using a tree view and directed graph;

FIG. 9 is a sample scratch graph view;

FIG. 10 is a sample higraph listview with dependency viewer;

FIG. 11 is a sample circular layout higraph view showing clusters;

FIG. 12 shows the result of automatic folding of clusters;

FIG. 13 shows a node expansion higraph view;

Figure 15:
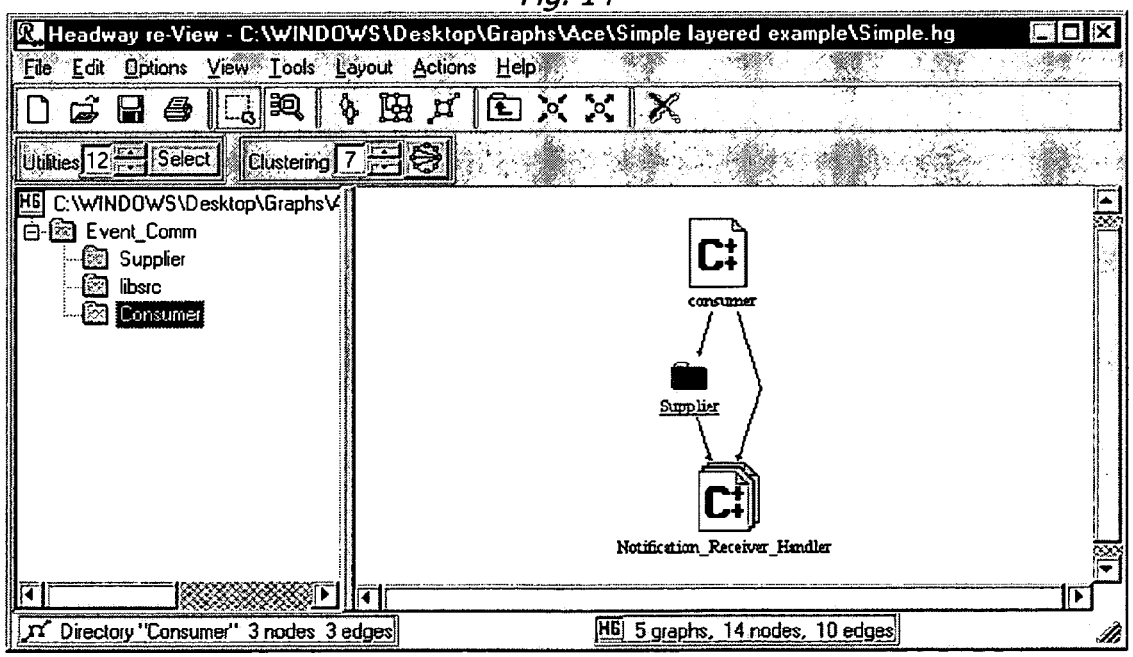
Figure 16:
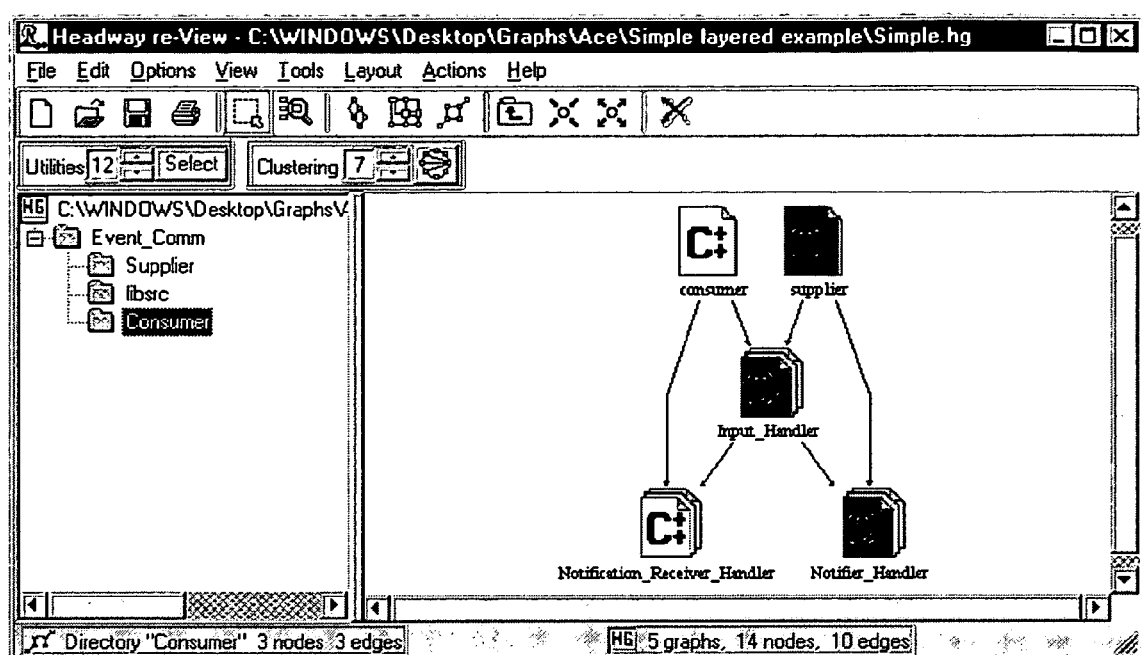

FIG. 15 also shows cross-graph view;

FIG. 16 shows another cross-graph view;

FIG. 17 shows a continuous value view of a higraph;

FIG. 18 shows a view of a higraph comprising UML notation.

SUMMARY

According to one aspect of the invention, there is provided a software analysis tool comprising:

means for converting software entities and their relationships into a graph having a structure of nodes interconnected by edges, and an editor comprising means for allowing a user to edit the graph, wherein the graph includes a meta node representing a child graph.

In another embodiment, the conversion means comprises means for bi-directionally folding and unfolding a graph between meta and child levels.

In one embodiment, the editor comprises means for automatically generating fresh graph layouts after manipulation.

In one embodiment, the conversion means comprises a plurality of back-ends, each being associated with an aspect of a software system.

In another embodiment, each back-end comprises means for converting the entities and the relationships of the associated aspect into nodes and edges of the graph.

In one embodiment, the back-ends are associated with managers.

In one embodiment, the managers comprise means for routing commands between the editor and the back-ends.

In another embodiment, each manager is associated with a group of back-ends.

In one embodiment, the back-ends associated with a particular manager share a common interface and set of operations.

In another aspect, the invention provides a dependency analysis system recorded on a computer-readable medium, comprising:

a node class for instiating node objects in memory representing aspects of an analyzed system as nodes of a graph;

a connection class for instantiating connection objects in memory representing dependencies between aspects of an analyzed system;

an edge class for instantiating edge objects representing collections of one or more connections or edges In one embodiment, the system further comprises:

at least one subclass of the node class, the subclass being specific to a particular category of system.

In another aspect, the invention provides a dependency analysis system recorded on a computer-readable medium, comprising:

an abstraction layer for providing a uniform interface to third-party analysis tools;

a graph model data structure for storing dependency information derived through the abstraction layer from third-party tools;

a rendering system for providing a plurality of views of the graph model data structure.

Still another aspect of the invention provides a dependency analysis system comprising:

a data structure stored in computer memory representing a hierarchy of graphs;

a rendering system for displaying the hierarchy of graphs;

a user interface responsive to a user action indicating a command to expand a displayed node, the user interface causing the rendering system to replace the displayed node with one or more child nodes in response to the user action.

DETAILED DESCRIPTION

The present invention comprises a system and method for automatically generating and laying out directed graphs representing dependencies determined or analyzed by conventional code and system management tools, including source code, system deployment, version, and network management tools. Two types of graph manipulation are supported: i) active manipulation in which changes to graph structure are propagated through the tools to change the structure of the analyzed system, and ii) passive manipulation by rearrangement and folding in which changes to graph structure do not reflect or cause changes to the structure of the analyzed system.

These features allow the product to present the many software dependencies to the user in a way that enables them to quickly grasp the inherant structure of the software, and to display or abstract out details as required for the task at hand.

The architecture of one preferred embodiment is schematically illustrated in FIG. 1. A three-layered architecture is employed. A user-interface layer is provided by the higraph editor 20. An abstraction layer 5 comprising a number of managers 10, 11, 12 provides a set of uniform interfaces to the higraph editor, while providing the interfaces required by conventional back-end tools 2,3,4. A version manager 10 provides interfaces for manipulating source code version control systems such as Rational Clearcase, Microsoft SourceSafe, CVS, SCCS and rcs. A deployment manager 11 provides interfaces for manipulating distributed computing systems such as Microsoft DCOM, Iona Orbix, and Sun J2EE. A back-end manager 12 provides interfaces for manipulating source code and integrated development environments such as C++ and Java source code, Microsoft Visual Studio, Rational Rose, and Iona Orbix. Through these manager interfaces, the system extracts dependency information from the analyzed systems and presents it in the form of directed graphs rendered for viewing and for active or passive manipulation by the user through the higraph editor 20. In one preferred embodiment, a system registry is used for back-end system discovery.

Referring to FIG. 1 an analysis tool 1 of the invention is shown at a high level. The tool 1 comprises three sets of back-ends 2, 3, and 4. Each back-end is a conversion or translation function associated with an aspect of a software system. For example, each of the following aspects has an associated back-end:

(a) C++ Source files
(b) Application Development Tool (one for each).
(c) A configuration management tool.

A converter 5 of the tool 1 comprises the back-ends 2, 3, and 4 and also a number of managers. In this embodiment, there is a version manager 10, a deployment manager 11, and a back-end manager 12. Each backend scans the information available in its domain and represents this in the form of a graph. For example, a back end for a specific programming language scans the source code. Files, packages, classes, methods and members may be represented as nodes, and dependency relationships between these language elements as edges between the corresponding nodes. The back-end manager also defines the different types of nodes in its domain, and a graphical representation for each of these types. If the user modifies the graph structure through the editor 20, and instructs that the corresponding change be made within the development environment, then the backend enacts any of the changes that pertain to its specific domain. An example of this might be to move a Class from one Java Package to another in order to minimise the dependancies. The user moves a node from one meta node to another in the editor 20, and the backend modifies the source code accordingly.

The backends invoke operations on the underlying operating system, on the APIs (Application Program Interface) of specific development tools, and interpret and modify data files that are created and read by such tools.

The managers serve as routers of commands between the editor 20 and the backends. The editor 20 uses them in order to establish which backends are available, and to present this information to the user. When the user selects a specific domain to be imported to the editor 20, the managers route the corresponding commands to the correct backend. Likewise user operations that require changes to the development environment are routed to the corresponding backend by the managers.

There are several different managers, each responsible for a distinct set of backends. The backends controlled by a manager share a common interface and set of operations. Different managers are required because domains fall into different categories each providing a distinct set of capabilities. For example language specific backends may be required to move one language element to a new container, whereas version control backends may be required to provide a list of all the known versions of a particular element.

The converter 5 interfaces with an editor 20 which receives graph definitions from the converter 5 and represents them as multi-dimensional directed graphs. These graphs represent the entities as nodes and their relationships as edges. On the left hand side of an "equation" in FIG. 2 is a traditional directed graph, Graph 1. On the right hand side is an equivalent structure represented as a graph that consists of two separate directed graphs; Graph 2 and Graph 3. In Graph 2, nodes B, C and D are represented by a single meta-hinode identified as "Group" in the drawing. A meta-hinode is a node that represents a child graph (in this case, Graph 3). Any edges in the original directed graph that connect to or from nodes now represented by the meta-hinode are now represented by a meta-edge. Each meta-edge indicates the existence of at least one relationship, and will in general represent multiple relationships. In FIG. 2, for example, the edge from node A to meta-hinode "Group" is a meta-edge that represents two edges (relationships) from A to B and A to C.

The action of taking a number of nodes in a graph and replacing them by a meta-node, meta-edges and a corresponding child graph is called folding. The two graphs on the right hand side of FIG. 2 could be converted back to the graph on the left hand side by unfolding the meta-node in Graph 2.

The editor 20 provides the user with a consistent interface with which the development environment may be viewed, analysed, comprehended and manipulated. The editor 20 presents graphs to the user in a split window that shows the vertical view on the left and the horizontal view on the right. FIG. 3 shows an example of an editor 20 display. Instead of a simple list of files on the right hand side of the window, the entities plus the relationships between them are displayed in the form of a directed graph.

Often, when directed graphs are used in computer applications, they are difficult to manipulate and comprehend due to their inherent complexity, and the enormous amount of manual effort required to lay them out. Once the effort has been invested into laying them out, any form of significant manipulation is impractical since the layout process needs to be repeated.

However, the editor 20 allows a complex directed graph to be comprehended and manipulated. This is achieved by the following features in combination:

1. The various directed graphs in the structure are laid out automatically. Significant manipulation is now feasible since re-layout takes only seconds or less.

2. Several layout schemes and parameters are provided in order to assist the user to identify the inherent structure of the directed graphs (software development artifacts and processes). FIG. 4 gives an example.

3. The user can fold and unfold the directed graphs by simply using a mouse to select the nodes, and then selecting menu commands, clicking the toolbar, or dragging and dropping to new locations.

4. Navigation around the structure is achieved by mouse clicks and double clicks.

The invention is not limited to the embodiments described, but may varied in construction and detail.

DEFINITIONS

A directed graph is a finite set of nodes (also called vertices or points) N={1,2,...m} and a set of directed arcs (also called links, branches, edges, or lines) A={(i,j),(k,l), . . . ,(s,t)} joining pairs of nodes in N. An arc (i,j) is directed from node i to node j. In FIG. 2, graph 1 comprises the set of nodes N={A,B,C,D,E,F} and arcs A={(A,B),(A,C),(B,D),(C,D),(D,E),(D,F)}.

A higraph is a mapping f of a directed graph G onto a directed graph H of the same or fewer nodes, such that for every node i in G,f(i) is a node in H and for every arc (i,j) in G,f(i,j) is an arc in H Thus every node i in G corresponds to exactly one node m in H (i.e. there is only one node m in H such that f(i)=m), but any node m in H may correspond to a group of more than one nodes in G (i.e. there may be more than one node $\{i_1, i_2, i_3, \ldots\}$ such that $f(i_1)=f(i_2)=f(i_3)=m$). H contains an edge (m, n) if and only if there is an edge (i,j) in G, where f(i)=m and f(i)=n. A node in H may thus represent a group of nodes in G and an edge in H may represent a group of edges in G.

Higraphs may be nested, so that a higraph g mapping H to a graph I of yet fewer nodes is also a higraph. A collection of higraphs $\{f_s\}$ such for each s, $f_{s+1}$ maps $f_s$ onto a graph of fewer nodes is also referred to as a higraph. Such a higraph forms a hierarchy of graphs, each having fewer nodes than the last.

The nodes of a higraph are called hinodes. At the bottom of the hierarchy are the leaf hinodes. All the leaf nodes plus the edges between them form the essential graph. A number of leaf nodes may be collected together in a higraph and represented by a single meta-hinode. Meta-hinodes may themselves be combined with other meta-hinodes and leaf nodes to form other meta-hinodes in a hierarchy. An edge between a meta-hinode and another node means that there is an edge on the essential graph between the latter and one or more of the children of the former.

A simple example of a higraph is shown in FIG. 2. In this example, Graph 1 on the left side is the essential graph of the HiGraph comprising Graph 2 and Graph 3 on the right side. The 3 selected nodes on Graph 1 (B, C and D) are "folded" to create Graph 2 and Graph 3. In Graph 2, the 3 folded nodes are represented by a single meta-hinode called "Group", and the Group node is associated with Graph 3 which contains the 3 folded nodes plus any edges between them. Although not explicitly shown on any graph, the connections from A to B and C, and from D to E and F are retained. They are represented on Graph 2 by the edges from A to Group and from Group to E and F. Unfolding the Group node on Graph 2 will cause Graphs 2 and 3 to become Graph 1 again.

In one preferred embodiment, the system separates the logical model represented by the higraph from any specific user-visible view of that model. Views are constructed by the system from the model and presented to the user.

The model of a Higraph is composed of hinodes. The hinodes immediately contained by a meta hinode are called its child hinodes. The hinode which immediately contains another hinode is called its parent hinode. All of the child hinodes and their child nodes down to the leaf hinodes are called the descendants of the root hinode. A leaf hinode may become a meta hinode when it's children are discovered.

The leaf hinodes preferably have a 1-1 correspondence with some entity in the environment under analysis. Many meta hinodes will also have such a 1-1 correspondence. Other meta hinodes may have a more tenuous relationship to the environment—they may be created temporarily by the user to group together other hinodes in order to assist with a specific task.

Primitive relationships, called connections, are maintained between hinodes. A connection between two hinodes preferably implies that there is a 1-1 correspondence between the hinodes and some entities in the environment, and that there is some relationship between those entities. Connections are typed and there may be several different types of connections in a Higraph. Two hinodes may share more than one connection, and connections may exist between both leaf and meta hinodes.

A hiedge is a non-primitive relationship between two hinodes that carries a definite set of connections. Preferably, a hiedge only exists because of the connections it carries, and does not exist on its own. A hiedge exists between two hinodes if there is one or more connections between the hinodes, or if there is at least one connection between one of the hinodes or its decendants and the other hinode or one of its decendants. As a non-primitive relationship, hinodes are preferably not retained within the model, but calculated as needed from the primitive connections and parent-child relationships.

In one example preferred embodiment, higraphs are represented in computer memory as instances of Java classes corresponding to different aspects of the model as described below.

EXAMPLE PREFERRED HIGRAPH MODEL JAVA EMBODIMENT

In this preferred embodiment, the HiGraph class comprises data and methods for representing and manipulating a higraph. An instance of the HiGraph class provides an entry point to the hinode tree in the form of a root hinode and provides a number of utility methods for finding specific hinodes so that calling code can be shielded from recursive searching through the tree. This is facilitated by redundant storage of all hinodes in a flat collection. In addition to the hinode management functionality, the HiGraph class is also responsible for managing a collection of HiConnection objects defining the (direct) dependencies between individual nodes. The methods of the HiGraph class are described in Appendix 1.

The HiNode class is preferably an abstract class (i.e. it must be subclassed to be used) that comprises data and methods for representing and manipulating a hinode, and for navigating from hinode to hinode within a higraph. Instances of the HiNode class represent hinodes in a higraph. An instance of HiNode may or may not have children, as may be determined by the canHaveChildren method. An instance of HiNode may also be a meta-hinode, as may be determined by the isMeta method. If it is a meta-hinode, it may not carry any direct connections. The data fields and methods of the HiNode class are described in Appendix 2.

Although preferably an abstract class, if DCOM compatibility is necessary, the HiNode class may preferably be a concrete class.

The HiNode class is also subclassed to provide a MetaNode class. The MetaNode class comprises data and methods for representing and manipulating an abstract organizational meta-hinode within a higraph. The methods of the MetaNode class are described in Appendix 3.

The HiNode class is subclassed to provide hinode implementations specific particular domains of analysis. For example, for source code dependency analysis, instances HiNode subclasses ClassNode, FieldNode and MethodNode are respectively used to represent classes, data fields and methods of analyzed source code.

The ClassNode class comprises data and methods for representing and manipulating a hinode representing a source code class such as a Java class. The methods of the ClassNode class are described in Appendix 4.

The FieldNode class comprises data and methods for representing and manipulating a hinode representing a data field of a source code class. An instance of the FieldNode class always has an instance of the ClassNode class as its parent, and the canHaveChildren method of the FieldNode class always returns false. The methods of the FieldNode class are described in Appendix 5.

The MethodNodeClass comprises data and methods for representing and manipulating a hinode representing a method of a source code class. An instance of the MethodNode class always has an instance of the ClassNode class as its parent, and the canHaveChildren method of the MethodNode class always returns false. The methods of the MethodNode class are described in Appendix 6.

Instances of the appropriate HiNode subclass are created using an instance of the NodeFactory class. The NodeFactory class includes methods for creating new instances of available HiNode subclasses by specifying the desired type.

The HiEdge class is an abstract class that represents an edge between two nodes. Concrete subclasses are provided for each specific type of edge in this preferred embodiment, including a HiConnection class and a Relationship class. The HiEdge class comprises constructor methods which require that the two nodes connected by the edge and the direction of the edge be specified to create an instance of the HiEdge class. The data fields, constructors, and methods of the HiEdge abstract class are described in Appendix 7.

The HiConnection class comprises data and methods for representing and manipulating a primitive connection between hinodes. The HiConnection class is a concrete subclass of the HiEdge class. The HiConnection class comprises a constructor, but HiConnection objects are preferably created using the AddConnection method of a HiGraph object.

The Relationship class comprises data and methods for representing and manipulating a non-primitive hiedge that carries connections between hiedges. The Relationship class is a concrete subclass of the HiEdge class. The methods of the Relationship class are described in Appendix 8.

Rendering a Higraph Model as a View

By providing a variety of different user-selectable renderings or views of a higraph, and allowing the user to perform both passive and active manipulations of the higraph using the views, it is possible to convey high-dimensional data of the higraph on a flat display. A preferred interface provides the user with consistent context information so that he or she can see how the information currently displayed relates to the overall environment under analysis or control.

The preferred interface also allows the user to view information at the user's desired level of detail by enabling the user to group arbitrary sets of hinodes together while preserving and displaying the relationship (hiedges) of the group to the rest of the environment.

Preferably, multiple views of a single Higraph model may be presented to the user, either simultaneously or alternatively. Each view presents an identifiable subset of the Higraph information and provides user operations that change the view or model.

One view for presenting just parent/child relationships is the tree view shown on the left in FIG. 6, as used by many familiar file system browsers, such as the Microsoft "Windows Explorer". Child hinodes are indented under the parent hinode, and the user can select how much detail is displayed by "expanding" parent nodes recursively.

A more expressive way to present just the hiedge relationships is to use a directed graph, where the nodes correspond to hinodes, and the edges represent hiedges. Preferably, in order to maintain the user's sense of context, a hinode is never displayed on the same directed graph as any of its ancestors or descendants. In this way, the user can "drill-down" to the level of detail required in the directed graph. This "drilling-down" operation, plus the information presented in tree view views maintains the user's sense of context.

An important aspect to be conveyed by views is the "depth" of hinodes or edges. This is the number of connections carried by a hiedge, or the number of descendants of a meta-hinode. In the example illustrated in FIG. 6, the number of connections carried by each hiedge is displayed as a number next to the corresponding edge on the graph.

In FIG. 7, a view similar to that of typical file browsers is illustrated. This combination of views is familiar to most computer users. The view in the left panel uses a tree view to display the hierarchical aspect of the underlying logical Higraph model. In the right hand window, a list view shows the child hinodes of the currently selected hinode. The two views work together so that when a node is selected on the left, the corresponding graph appears in the right. Double-clicking a node on the right causes the directed graph contained within the corresponding hinode to appear.

The user can re-arrange the Higraph using mouse operations to select, drag and drop nodes as with the Windows Explorer. For example, dropping one node on top of another will make the hinode corresponding to the former to be a child of that corresponding to the latter. The moved node disappears, and any hiedges that it had are merged with those shared by the new parent.

The columns of information provided on the right pane will be specific to the domain under analysis. Information pertaining to meta-hinodes is propagated up from descendant hinodes. It is possible to sort the rows based on any of the columns.

In FIG. 8, the left window functions as in FIG. 7. The right window uses a directed graph to show relationships between hinodes at the currently selected level. This style is preferably restrictive to aid its function as a "base" view through which the user comprehends or modifies the structure of the underlying higraph. In particular, the directed graph preferably always shows all the hinodes that share a single parent, and all of the hiedges between the displayed hinodes. Filtering may be permitted, but preferably not to the extent that the user loses the concept of a "base" view.

Occasionally the user may find the base view too restrictive. The scratch graph view illustrated in FIG. 9 gives the user flexibility to view hinodes on the same directed graph even if they do not share the same parent. This view is particularly useful for following or "chasing" dependencies across and into the higraph, cutting across the inherent higraph boundaries. In the diagram, "+" and "−" buttons on each hinode let the user quickly expose or hide the associated hiedges. Double-clicking a meta-hinode causes just that hinode to be expanded within the current graph—the hinode disappears and is replaced by its children. The user can make the view more specific to analyzing dependencies by replacing the expanded meta-hinode with only those child nodes that have hiedges with other nodes currently on the graph.

The dependency viewer illustrated in the lower two panes of FIG. 10 presents a view of the higraph from the perspective of a single hinode. As the user selects a hinode in one of the other views, such as the list view illustrated in the top pane of FIG. 10, all nodes connected to and from the selected node are displayed in the dependency viewer. Initially, the nodes are shown at the highest possible level (least detailed). If the user wishes to see which nodes within a meta hinode are used by the selected node, double clicking the meta node causes them to appear.

A number of different graph views are provided by a preferred system, including for example, hierarchical, circular, orthogonal and symmetrical. The user also may rearrange nodes or sets of nodes manually, and pan and zoom to display selected areas of a graph.

The circular layout is particularly useful for identifying inherent "clusters" within graphs. The user can easily modify the clustering parameters in order to find those most suited to the current graph. The circular layout is illustrated in FIG. 11.

The user can instruct the system to fold the clusters shown in FIG. 11, resulting in the display illustrated in FIG. 12.

Using the view illustrated in FIG. 13, a user may also expand a meta-hinode and display its sub-graph nested within the current graph. Expansion is within expanded nodes is possible to an unlimited depth. Expanded nodes may also be re-collapsed. The user can also use this view to view nodes from other graphs that are connected to nodes in the current graph. Such nodes are clearly distinguishable as external to the current graph. The system can also highlight nodes connected to a specific node, or in its dependency closure. In addition, the system can hide specific nodes or nodes that match certain criteria (e.g. nodes with more than a certain number of dependencies).

Figure 14:
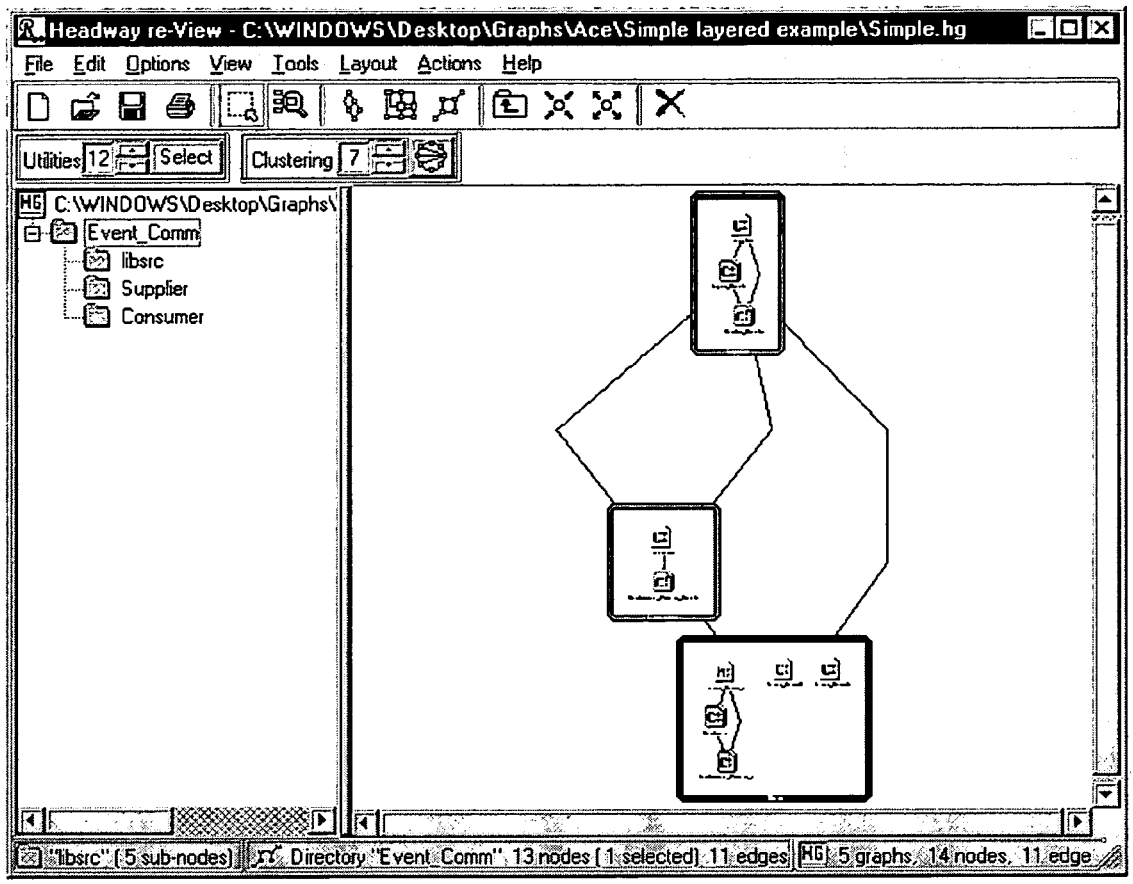
FIG. 14 shows a cross-graph view.

The preferred system always provides the user with the ability to rearrange the higraph to view the information most relevant to the user's task. Cross-graph browsing allows the user to view dependency information that does not conform directly to the current Higraph structure, but without actually modifying the Higraph. For example, given the higraph view illustrated in FIG. 14, a user browsing down to Consumer, selecting the Consumer source file and issuing the command to "show usees on this graph" causes the view illustrated in FIG. 15 to be displayed.

In FIG. 15, the "Supplier" directory is show in a distinguishable color or shape to indicate that it is from a different graph. The dependency from Supplier to Notification_Receiver_Handler is also shown, and the graph is complete for all nodes shown. Selecting the Supplier directory and issuing the command "show children on this graph" results in an effect similar to Unfolding, except that the Higraph is not actually changed, as illustrated in FIG. 16.

The reverse of this operation is to select any of the nodes from a different graph and issue the command "show parent on this graph". A meta-hinode is never displayed on the same graph as any of its descendants.

In addition to permitting the display of nodes that from other graphs, the system preferably permits nodes from the current graph to be hidden. The view indicates that there are hidden nodes, and a command is provided to display all nodes that belong. If a node has dependencies, then selecting a + or − displayed on the node respectively causes those dependencies to be displayed or hidden. Nodes also have a fold/unfold symbol if they have children or parents. The user may also create a number of different views of a single graph and store or view the multiple views simultaneously.

Another aspect to this capability is the ability to select the type of elements to be displayed within a hierarchy. For example, a "full" hierarchy may have a project containing a number of components each containing a number of modules each containing a number of classes. The user can choose to view the higraph for the project without the modules to show all the classes within a component, or without the modules or components to effectively see just the logical view.

The user can view any selected node attribute in such a way that the relative value of the attribute is easily discernable. FIG. 17 illustrates a graph that uses brightness to display the relative values—the darker the node the greater the value of the attribute. This feature can be used to enable the user to analyze such values as percent complete, lines of code, complexity, time since last modification (stability), percent changed, etc.

As illustrated in FIG. 18, Unified Modeling Language (UML) can also be incorporated into the higraph views to add information for the UML-literate user.

EXAMPLE PREFERRED RENDERING IMPLEMENTATION

The system may be implemented using any of several commercially available graphing libraries that support the rendering of directed graphs. One preferred product is the Graphical Editor Toolkit (GET) from Tom Sawyer Software. GET includes facilities for causing a directed graph to be displayed in a number of different layouts, specifically hierarchical, circular, orthogonal and symmetric.

The present system renders hinodes using GET by traversing the HiNode objects within the HiGraph object representing the higraph to be rendered, and using the information derived thereby to instantiate tsNode objects in the GET library. GET uses tsNode objects to display nodes of a graph. In general, there is a one-to-one correspondence between the rendered Hinodes of a Higraph and the tsNode objects in the Tom Sawyer library. Likewise, there is a correspondence between rendered Hiedges and tsEdge objects. tsLables are associated with the tsEdges to indicate the "depth". The specific nodes and edges are displayed in a graph is determined by the rules of the enclosing view.

For example, the higraph in FIG. 8 is rendered with the Tom Sawyer GET. The higraph contains all of the HiNodes returned by the GetChildren method of the HiNode object selected in the tree view. Once the nodes are displayed, a tsEdge is created for any connections returned by the getConnections method of each displayed Hinode for which both "ends" of the connection are on the graph.

The representations of the nodes varies according to their type. This is implemented by customizing the Tom Sawyer View Factory mechanism.

When the user double-clicks on a node in a displayed GET tsDigraph, a DoubleClickOnNode event is fired and the handler for this event checks the type of the node that was double-clicked. Double-clicking on a "leaf" node causes the corresponding file to be opened in the application defined for the file type (generally a back-end integrated development environment). When the user double-clicks on a meta-hinode, the system invokes GET to erase the selected tsDigraph, the corresponding hinode in the tree view is selected, and the tsDigraph is populated with the nodes and edges that correspond to the result of the getChildren method on the double-clicked node.

The directed graph illustrated in FIG. 9 is also implemented as a tsDigraph. In this case however there is no direct relationship between the tree view on the left and the tsDigraph since the Scratch Graph can display nodes from arbitrary locations in the higraph. The Tom Sawyer View Factory mechanism is extended to add the "+" and "−" symbols. The View Factory is also implemented so that the mouse symbol changes as it passes over these symbols, and to generate custom events when they are clicked by the user.

When a "+" is clicked on the right of a tsNode such as the "HiGraph" tsNode in FIG. 9, the system displays all of the nodes to which this node is connected. A user option to "show metanodes" specifies whether all of the connected classes are shown, or the connected meta-hinodes are shown at the highest level possible. The former list of classes is obtained directly from the getConnections method of the HiNode instance corresponding to the tsNode on which the "+" was clicked. The latter requires that the highest meta-hinodes be calculated as follows. For each of the connected hinodes returned by the getConnections method of the HiNode, the findCommonAncestor method is invoked to find the lowest ancestor that is common with the selected node. The displayed node is the child of the common ancestor that contains the connected node. Nodes are only displayed once and if a connection is already represented as a tsEdge, then the "depth" of the hiedge is increased (this is displayed on the tsDigraph as a tsLabel).

The Tom Sawyer GET provides many parameters to fine tune each of the layout algorithms. Defaults suited to the application domain are set for most of the parameters. A small group of parameters may be usefully manipulated by the user. For example, when viewing large portions of software systems the circular layout can be useful. In this case, the most relevant parameter is the "degree" of the graph and the example implementation provides a "clustering" control just under the tool bar permitting the user to vary the degree parameter. The higher this number, the bigger the clusters. The system reads the clustering control and sets the "degree" property of the tsDigraph immediately prior to rendering a circular layout.

Many variations of the preferred embodiments described in detail herein will be evident to those of skill in the art. The invention is not limited to those embodiments disclosed herein.

The invention claimed is:

1. A computer system comprising memory for storing a software analysis tool comprising:
    means for converting software entities and their relationships into a graph having a first structure of nodes interconnected by edges, said graph further comprising a tree comprising a plurality of subtrees, each said subtree representing one or more nodes in the first structure, the relationship among the plurality of subtrees representing the edges among nodes in the first structure; and
    an editor comprising means for allowing a user to edit the graph;
    wherein the software entities comprise nongenetic software program code; wherein the conversion means comprises means for bi-directionally folding and unfolding a graph between meta and child levels.

2. A software analysis tool as claimed in claim 1, wherein the editor comprises means for automatically generating fresh graph layouts after manipulation.

3. A software analysis tool as claimed in claim 1, wherein the conversion means comprises a plurality of back-ends, each being associated with an aspect of a software system comprising software program code.

4. A software analysis tool as claimed in claim 3, wherein each back-end comprises means for converting the entities and the relationships of the associated aspect into nodes and edges of the graph.

5. A software analysis tool as claimed in claim 3, wherein the back-ends are associated with managers.

6. A software analysis tool as claimed in claim 5, wherein the managers comprise means for routing commands between the editor and the back-ends.

7. A software analysis tool as claimed in claim 5, wherein each manager is associated with a group of back-ends associated with a group of back-ends.

8. A software analysis tool as claimed in claim 7, wherein the back-ends associated with a particular manager share a conimon interface and set of operations.

* * * * *